(12) United States Patent
Ahn et al.

(10) Patent No.: US 9,565,595 B2
(45) Date of Patent: Feb. 7, 2017

(54) BANDWIDTH CALCULATING METHOD AND APPARATUS FOR RESOURCE RESERVATION IN MVOIP SYSTEM

(75) Inventors: Taejin Ahn, Daejeon (KR); Hyoungsoo Kim, Daejeon (KR); Soonuk Seol, Daejeon (KR)

(73) Assignee: KT CORPORATION, Kyeonggi-do (KR)

( * ) Notice: Subject to any disclaimer, the term of this patent is extended or adjusted under 35 U.S.C. 154(b) by 1278 days.

(21) Appl. No.: 13/513,004

(22) PCT Filed: Nov. 24, 2010

(86) PCT No.: PCT/KR2010/008357
§ 371 (c)(1),
(2), (4) Date: May 31, 2012

(87) PCT Pub. No.: WO2011/068325
PCT Pub. Date: Jun. 9, 2011

(65) Prior Publication Data
US 2012/0294174 A1   Nov. 22, 2012

(30) Foreign Application Priority Data

Dec. 1, 2009   (KR) .................. 10-2009-0117814

(51) Int. Cl.
*H04W 28/20* (2009.01)
*H04W 76/02* (2009.01)

(52) U.S. Cl.
CPC .......... *H04W 28/20* (2013.01); *H04W 76/022* (2013.01)

(58) Field of Classification Search
CPC ........................ H04W 28/20; H04W 76/022
See application file for complete search history.

(56) References Cited

U.S. PATENT DOCUMENTS

| | | | |
|---|---|---|---|
| 7,173,907 B1* | 2/2007 | Weber | H04L 12/5601 370/230 |
| 2003/0016630 A1* | 1/2003 | Vega-Garcia | H04L 29/06 370/252 |
| 2006/0045074 A1 | 3/2006 | Lee | |
| 2006/0062251 A1* | 3/2006 | Lim | H04L 29/06 370/468 |

(Continued)

FOREIGN PATENT DOCUMENTS

| KR | 10-2002-0045465 A | 6/2002 |
|---|---|---|
| KR | 10-2003-0097252 A | 12/2003 |

(Continued)

OTHER PUBLICATIONS

Korean Intellectual Property Office, International Search Report for International Application No. PCT/KR2010/008357, Aug. 25, 2011.

(Continued)

*Primary Examiner* — Khaled Kassim
(74) *Attorney, Agent, or Firm* — IP Legal Services, LLC (57) ABSTRACT

A provided is a bandwidth calculating method for resource reservation. The method includes receiving a message having a CODEC type and a ptime value wherein the ptime denotes an interval of transmitting a packet, extracting the CODEC type and the ptime value from the received message, and calculating a required bandwidth using the extracted CODEC type and the extracted ptime value.

11 Claims, 7 Drawing Sheets

(56) References Cited

U.S. PATENT DOCUMENTS

| | | | |
|---|---|---|---|
| 2006/0159124 A1* | 7/2006 | Henry | H04M 7/006 370/468 |
| 2006/0291447 A1* | 12/2006 | Siliquini | H04L 29/06027 370/352 |
| 2007/0275713 A1* | 11/2007 | Tidwell | H04L 1/0007 455/425 |
| 2008/0069086 A1 | 3/2008 | Shin et al. | |
| 2008/0130511 A1 | 6/2008 | Koo et al. | |
| 2010/0074165 A1* | 3/2010 | Yokota | H04L 12/12 370/315 |
| 2011/0208853 A1* | 8/2011 | Castro-Castro | H04L 12/14 709/223 |
| 2012/0059943 A1* | 3/2012 | Castro Castro | H04L 12/14 709/227 |
| 2014/0050214 A1* | 2/2014 | Tung | H04L 65/102 370/352 |

FOREIGN PATENT DOCUMENTS

| | | |
|---|---|---|
| KR | 10-2004-0104870 A | 12/2004 |
| KR | 10-2006-0066600 A | 6/2006 |
| KR | 10-2007-0073626 A | 7/2007 |
| KR | 10-2008-0052258 A | 6/2008 |

OTHER PUBLICATIONS

Korean Intellectual Property Office, Written Opinion of the International Searching Authority for International Application No. PCT/KR2010/008357, Aug. 25, 2011.

* cited by examiner

BANDWIDTH CALCULATING METHOD AND APPARATUS FOR RESOURCE RESERVATION IN MVOIP SYSTEM

CROSS REFERENCE TO RELATED APPLICATIONS

This application is a National Stage Patent Application of PCT International Patent Application No. PCT/KR2010/008357 (filed on Nov. 24, 2010) under 35 U.S.C. §371, which claims priority to Korean Patent Application No. 10-2009-0117814 (filed on Dec. 1, 2009), the teachings of which are incorporated herein in their entireties by reference.

TECHNICAL FIELD

Exemplary embodiments of the present invention relate to a bandwidth calculating method for resource reservation in a mobile Voice over Internet Protocol (mVoIP) system; and, more particularly, to a bandwidth calculating method for resource reservation in a mVoIP system, which accurately calculates bandwidths required for uplink and downlink of originating and terminating mobile terminals by extracting an audio CODEC type and a ptime value from a CODEC-data Attribute Value Pair (AVP) transferred by a Call Session Control Function (CSCF) in order to dynamically allocate a bandwidth required for communication.

Hereinafter, the ptime denotes an interval time of transmitting Real-Time Transport Protocol (RTP) packets. Particularly, the ptime indicates an interval time in a unit of millisecond (ms) to transmit a RTP packet.

BACKGROUND ART

A typical International standard such as a 3GPP TS 29.213 has introduced a method of calculating a bandwidth (BW) as follows. Here, 3GPP TS stands for $3^{rd}$ Generation Partnership Project Technical Specification.

At first, a bandwidth (BW) is calculated using an Application Specific Maximum (AS) value defined in a CODEC-data Attribute Value Pair (AVP) in a diameter AAR message. Herein, AAR stands for Authentication, Authorization, and Request.

Secondly, if the AS value is not defined in the CODEC-data AVP, the bandwidth (BW) is calculated using a default value specified by an operator.

Such a typical BW calculating method defined in 3GPP TS 29.213 has following problems.

First of all, the typical BW calculating method cannot be used for a terminal or a Media GateWay (MGW) that does not use an AS field. Since the AS field is not a mandatory condition in a Session Description Protocol (SDP), a terminal or a Media GateWay (MGW) may not use the AS field. In this case, the typical BW calculating method cannot be used to calculate a bandwidth (BW).

Secondly, if a bandwidth is calculated and allocated using a default value specified by an operator, the allocated bandwidth may become insufficient during communication or an excessive bandwidth may be unnecessarily allocated according to a CODEC type used for communication. Accordingly, it is difficult to effectively manage resources.

Thirdly, a bandwidth required for communication cannot be accurately and dynamically allocated.

DISCLOSURE OF INVENTION

Technical Problem

As described above, the typical bandwidth calculating method may not calculate a bandwidth required for communication, may have difficulties to effective manage resources, and may not dynamically and accurately allocate a bandwidth required for communication.

Solution to Problem

In order to overcome the above technical problem, an embodiment of the present invention is directed to a bandwidth calculating method for resource reservation in a mVoIP system, which accurately calculates uplink and downlink bandwidths of originating and terminating mobile terminals by extracting an audio CODEC type and a ptime value from a CODEC-data Attribute Value Pair (AVP) transferred from a Call Session Control Function (CSCF) to dynamically allocate a bandwidth required for communication.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for calculating a bandwidth includes receiving a message having a CODEC type and a ptime value wherein the ptime denotes an interval of transmitting a packet, extracting the CODEC type and the ptime value from the received message, and calculating a required bandwidth using the extracted CODEC type and the extracted ptime value.

In accordance with another embodiment of the present invention, a apparatus for calculating a bandwidth includes reception unit configured to receive a message having a CODEC type and a ptime value wherein the ptime denotes an interval of transmitting a packet; extract unit configured to extract the CODEC type and the ptime value from the received message, and calculation unit configured to calculate a bandwidth using the extracted CODEC type and the extracted ptime value.

Advantageous Effects of Invention

A bandwidth calculating method in accordance with an embodiment of the present invention can accurately calculate bandwidths required for uplinks and downlinks of originating and terminating terminals by extracting an audio CODEC type and a ptime value from a CODEC-data AVP transferred by a Call Session Control Function (CSCF).

Accordingly, a bandwidth required for communication can be accurately and dynamically allocated.

BRIEF DESCRIPTION OF DRAWINGS

FIG. 1 is a diagram illustrating a mobile Voice over IP (mVoIP) system where the present invention is applied to.

BEST MODE FOR CARRYING OUT THE INVENTION

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Throughout the specification, when one part is described as being connected to the other part, it may mean that one part is directly or indirectly connected to the other part. It may also mean that one part is electrically connected to the other part with a predetermined device interleaved between the one part and the other part. Further, when a first constituent element is described as including or comprising a second constituent element, it may mean that the first constituent element further includes other constituent elements unless it is specifically defined in the specification.

Figure 1:
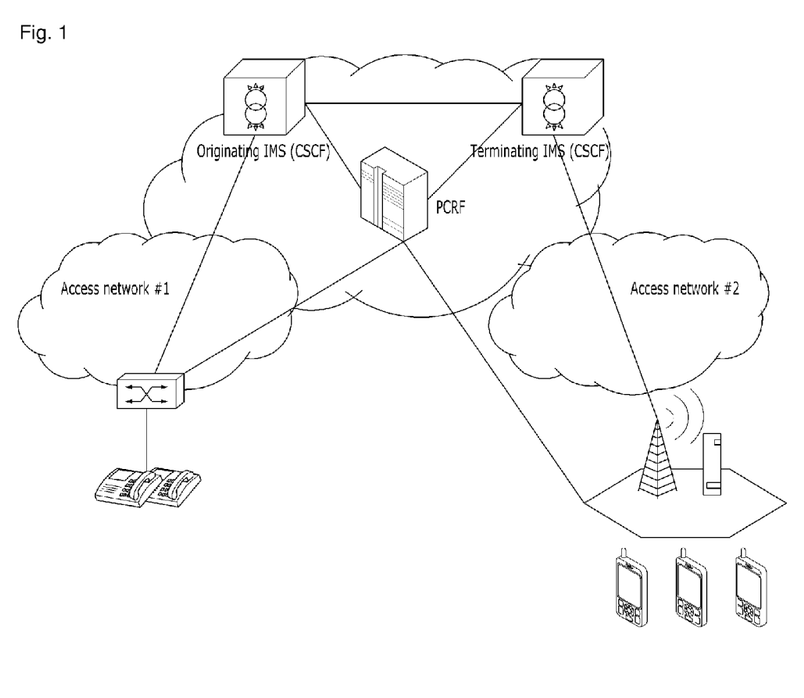

FIG. 1 is a diagram illustrating a mobile Voice over Internet Protocol (mVoIP) system where the present invention is applied to. Particularly, FIG. 1 illustrates relation between a Call Session Control Function (CSCF) and a Policy and Charging Rule Function (PCRF).

The PCRF is a system for setting up a Quality of Service (QoS) policy and providing a flow-based charging rule. The PCRF collects basic service information from various service systems, verifies a right of a corresponding service according to a policy decided by a network operator, and transfers a QoS policy and a charging rule for allocating a network bandwidth to a access network system.

Meanwhile, a Call Session Control Function (CSCF) is included in an IP Multimedia Subsystem (IMS). The CSCF handles operations for processing a call among functions of the IMS. The CSCF includes an Incoming Call GateWay (ICGW), a Call Control Function (CCF), a Serving Profile Database (SPD), and an Address Handling (AH).

Herein, the ICGW operates as an entry point and routes an incoming call. Further, the ICGW performs a service triggering process for an incoming call such as a call screening process and a call forwarding process. Moreover, the ICGW inquires about address handling and communicates with a Home Subscriber Server (HSS).

The CCF performs a call setup process, a call termination process, a call state/event management process, an interaction with a Multimedia Resource Function (MRF) for multi-services, a call event report process for charging, and a process for receiving and processing an application level registration.

The SPD manages user profile data by communicating with a HSS as a home domain and performs a process similar to a Visitor Location Register (VLR) of a typical network that informs a home domain when a user initially accesses to.

The AH analyses, transforms, and modifies an address and provides a mobile IP function.

Since the CSCF performs different functions according to a network where a subscriber is located, the CSCF is logically classified into a Proxy-CSCF (P-CSCF), an Interrogating CSCF (I-CSCF), and a Serving-CSCF (S-CSCF) based on a location and a roll thereof. For example, the P-CSCF guarantees QoS by interacting with the PCRF.

Figure 2:
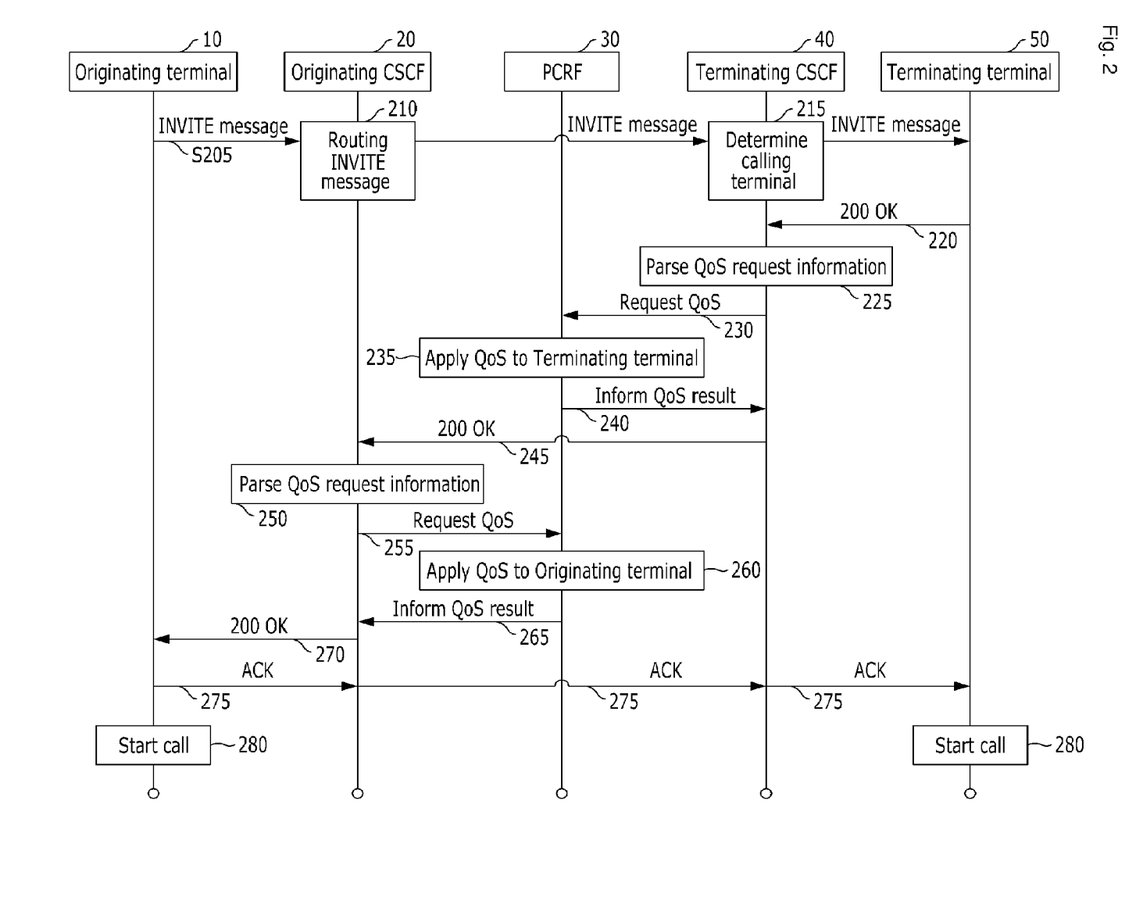
FIG. 2 is a flowchart illustrating a method for operating an mVoIP system of FIG. 1.

FIG. 2 is a flowchart illustrating a method of operating the mVoIP system of FIG. 1. That is, FIG. 2 illustrates a flow of applying QoS between a CSCF of an IMS and a PCRF.

At step S205, an originating terminal 10 sends an INVITE message to an originating CSCF 20 in order to request a terminating terminal for establishing call connection. A header of the INVITE message may include predetermined information necessary to process the message. For example, the header of the INVITE message may include information about a Call-ID. A body of the INVITE message may include information about a media type such as video or audio used during communication, an IP address of a terminal, a CODEC type, and a communication port in a Session Description Protocol (SDP).

At step S210, the originating CSCF 20 routes the INVITE message received from the originating terminal 10 to the terminating CSCF 40.

At step S215, the terminating CSCF 40 determines the terminating terminal is registered to it using information included in the INVITE message received from the originating CSCF 20 and sends the INVITE message to the terminating terminal 50.

At step S220, the terminating terminal 50 sends a response message 200 (OK) to the terminating CSCF 40 in response to the received INVITE message. The response message 200 OK includes information about a media type used in the terminating terminal 50, an IP address, a CODEC type, and a communication port in a SDP.

At step S225, the terminating CSCF 40 analyzes the INVITE message and the response message OK 200 and extracts information necessary for requesting corresponding QoS, such as an IP address, a communication port, and a CODEC type of a terminal.

At step S230, the terminating CSCF 40 requests QoS by sending the extracted information to a PCRF 30. The terminating CSCF 40 may use a standard Diameter RX message such as an Authentication-Authorization-Request (AAR) message to send the extracted information.

At step S235, the PCRF 30 applies predetermined QoS to the terminating terminal 50 in response to the requested QoS from the terminating CSCF 40.

At step S240, the PCRF 40 analyzes the result of applying the predetermined QoS and sends the result to the terminating CSCF 40. The PCRF 40 may use a standard diameter Rx message such as Authentication-AuthorizationAnswer (AAA) messages to transmit the QoS apply result.

At step S245, the terminating CSCF 40 transmits a response message 200 OK corresponding to the result of applying the received QoS to the originating CSCF 20 in response to the INVITE message.

At step S250, the originating CSCF 20 extracts information for requesting QoS, such as an IP address, a communication port, and a CODEC type of a terminal, by analyzing the INVITE message and the response message 200 OK.

At step S255, the originating CSCF 20 requests a QoS by sending the extracted information to the PCRF 30. The originating CSCF 20 may use a standard diameter Rx message such as an Authentication-Authorization Request (AAR) message to send the extracted information.

At step S260, the PCRF 30 applies the requested QoS for the originating terminal 10 in response to the received QoS request from the originating CSCF 20.

At step S265, the PCRF 30 analyzes a result of applying the QoS and transmits the analysis result to the originating CSCF 20. The PCRF 30 may use a standard diameter Rx message such as an Authentication-AuthorizationAnswer (AAA) message to transmit the analysis result.

At step S270, the originating CSCF 20 transmits a response message 200 OK based on the QoS applying result to the originating terminal 10 in response to the INVITE message.

At step S275, the originating terminal 10 transmits an ACK message to the terminating terminal in response to the response message through the originating CSCF 20 and the terminating CSCF 40.

At step S280, the originating terminal 10 and the terminating terminal 50 start a call with QoS applied.

Figure 3:
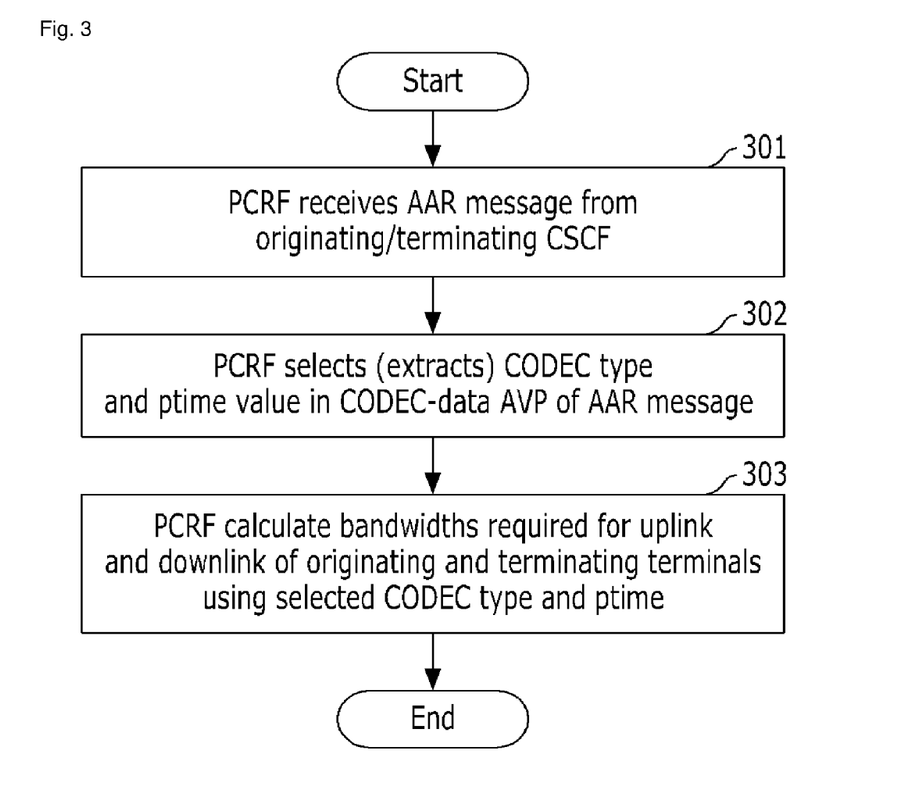
FIG. 3 is a flowchart illustrating a bandwidth calculating method for resource reservation in an mVoIP system in accordance with an embodiment of the present invention.

FIG. 3 is a flowchart illustrating a bandwidth calculating method for resource reservation in an mVoIP system in accordance with an embodiment of the present invention.

At step S301, a PCRF receives an Authentication, Authorization, and Request (AAR) message from originating/terminating CSCFs. Here, the received AAR message includes information about a CODEC type and a ptime value. The CODEC type denotes a type of audio CODEC to be used for communication and the ptime denotes an interval time for transmitting a RTP packet.

For example, a CODEC-data AVP, which is included in a Media-Component-Descriptor AVP of an AAR diameter message described in the step S230 of FIG. 2, has the following contents. Here, the AAR Diameter message is a QoS applying message of a terminating terminal.

Downlink offer
audio 13004 RTP/AVP 18 101
b=TIAS:8000
b=AS:24
a=rtpmap:18 G729/8000/1
a=rtpmap:101 telephone-event/8000/1
a=ptime:20
a=sendrecv
Uplink answer
audio 13006 RTP/AVP 18 101
b=TIAS:8000
b=AS:24
a=rtpmap:18 G729/8000/1
a=rtpmap:101 telephone-event/8000/1
a=ptime:20
a=sendrecv The CODEC-data AVP included in an Media-Component-Descriptor AVP of an AAR Diameter message described in the step S255 of FIG. 2 include the following contents. Herein, the AAR Diameter message is a QoS applying message of a originating terminal.

Uplink offer
audio 13004 RTP/AVP 18 101
b=TIAS:8000
b=AS:24
a=rtpmap:18 G729/8000/1
a=rtpmap:101 telephone-event/8000/1
a=ptime:20
a=sendrecv Downlink answer
audio 13006 RTP/AVP 18 101
b=TIAS:8000
b=AS:24
a=rtpmap:18 G729/8000/1
a=rtpmap:101 telephone-event/8000/1
a=ptime:20
a=sendrecv At step S302, the PCRF extracts a CODEC type and a ptime value from the CODEC-data AVP of the AAR message. Here, the CODEC type is a type of audio CODEC to be used for communication and the ptime is an interval of transmitting a RTP packet.

In order to calculate bandwidths required for four cases such as an uplink of a originating terminal, a downlink of a originating terminal, an uplink of a terminating terminal, and a downlink of a terminating terminal, a CODEC type and a ptime value for each case must be known.

CODEC type: the same CODEC between the originating/terminating terminals ptime values for an uplink and a downlink of a originating terminal and an uplink and a downlink of a terminating terminal Here, the ptime value is one of following three values.

1. A ptime value described in a Session Description Protocol (SDP) transmitted from a terminating terminal.

2. A ptime value described in a SDP of an originating terminal when the terminating terminal does not define a ptime value.

3. A default ptime value setup for each CODEC at a system when a ptime value is not defined in the SDPs of the terminating and originating terminals.

Table 1 shows the method for selecting a CODEC type and a ptime value for calculating bandwidths of a originating/terminating terminal for four cases such as an uplink of a originating terminal, a downlink of a originating terminal, an uplink of a terminating terminal, and a downlink of a terminating terminal.

TABLE 1

| | | AAR message from originating terminal | AAR message from terminating terminal |
|---|---|---|---|
| Uplink bandwidth | ptime | ptime of downlink answer- ptime of uplink offer (when ptime is not defined in downlink answer)- Default ptime defined for each CODEC (when no ptime defined in downlink answer and uplink offer) | ptime of downlink offer- ptime of uplink answer (when ptime is not defined in downlink offer)- Default ptime defined for each CODEC (when no ptime defined in downlink offer and uplink answer) |
| | CODEC | First CODEC in downlink answer | First CODEC of uplink answer |
| Downlink bandwidth | ptime | ptime of uplink offer- ptime of downlink answer (when ptime is not defined in uplink offer)- Default ptime of each CODEC (no ptime is defined in uplink offer and downlink answer) | ptime of uplink answer- ptime of downlink offer when ptime is not defined in uplink answer- Default ptime defined for each CODEC (when no ptime is defined in uplink answer and downlink offer) |
| | CODEC | First CODED of downlink answer | First CODEC of uplink answer |

At step S303, the PCRF accurately calculates bandwidths of uplinks and downlinks of originating and terminating terminals using the selected CODEC type and ptime.

Here, the following four bandwidths are calculated.
1. bandwidth required for uplink of originating terminal
2. bandwidth required for downlink of originating terminal
3. bandwidth required for uplink of terminating terminal
4. bandwidth required for downlink of terminating terminal The uplink and downlink bandwidths are calculated using equation shown below.

MathFigure 1

$$Bandwidth(BW) = (TIAS + 320,000/ptime)/1000 \quad [Math. 1]$$

Here, TIAS denotes "Transport Independent Application Specific bandwidth modifier" and it is decided according to a CODEC type (Please see Table 2 for further detail).

Table 2 exemplary shows bandwidths calculated according to Eq. 1.

TABLE 2

| CODEC type | B = TIAS | Bandwidth (kbps) required according to ptime value (ms) | | | | | |
|---|---|---|---|---|---|---|---|
| | | ptime = 10 | 20 | 30 | 40 | 50 | 60 |
| G.711 | 64000 | 96 | 80 | 75 | 72 | 71 | 70 |
| G.723 | 64000 | 96 | 80 | 75 | 72 | 71 | 70 |
| G.729 | 8000 | 40 | 24 | 19 | 16 | 15 | 14 |
| IPCMWB | 128000 | 160 | 144 | 139 | 136 | 135 | 134 |
| EG.711U | 64000 | 96 | 80 | 75 | 72 | 71 | 70 |
| ILBC | 15200 | 48 | 32 | 26 | 24 | 22 | 21 |

Hereinafter, a method for calculating bandwidths by selecting a CODEC type and a ptime value for four cases such as an uplink of a originating terminal, a downlink of a originating terminal, an uplink of a terminating terminal, and a downlink of a terminating terminal will be described in detail with reference to FIGS. 4 to 7.

Figure 4:
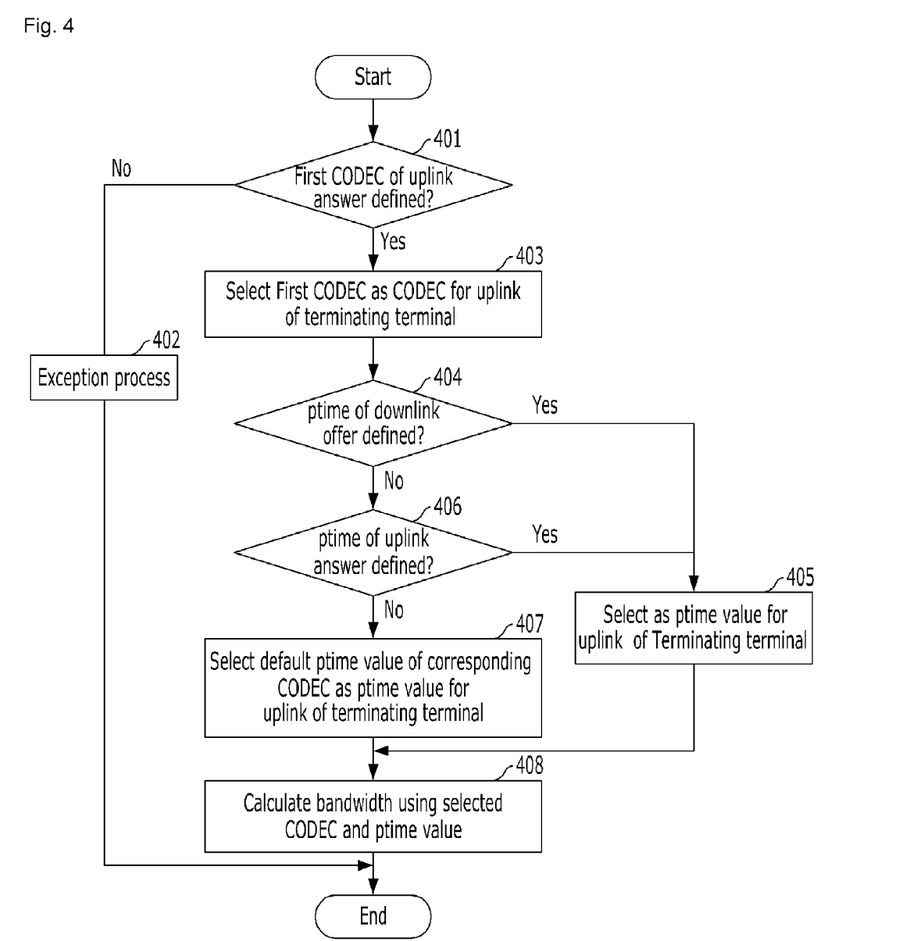
FIG. 4 is a flowchart illustrating a method for calculating a bandwidth required for an uplink of a terminating terminal in accordance with an embodiment of the present invention.

FIG. 4 is a flowchart illustrating a method for calculating a bandwidth required for an uplink of a terminating terminal in accordance with an embodiment of the present invention.

At step S401, it is determined whether a first CODEC of an uplink answer is defined in a CODEC-data AVP of a Media-Component-Descriptor AVP of an AAR diameter message described in the step S230 of FIG. 2. At step S402, if the first CODEC is not defined, an exception process is performed. If the first CODEC is defined, the first CODEC of the uplink answer is selected as a CODEC type of the uplink of the terminating terminal at step S403.

At step S404, it is determined whether a ptime value of a downlink offer is defined in a CODEC-data AVP in a Media-Component-Descriptor AVP of the AAR diameter message which was described in the step S230 of FIG. 2. If it is defined, the ptime value of the downlink offer is selected as a ptime value of the uplink of the terminating terminal at step S405.

If the ptime value of the downlink offer is not defined at the step S404, it is determined whether a ptime value of an uplink answer is defined in a CODEC-data AVP in a Media-Component-Descriptor AVP of an AAR diameter message described in the step S230 of FIG. 2 at step S406. If the ptime value is defined, the ptime value of the uplink answer is selected as a ptime value of the uplink of the terminating terminal at step S405.

If the ptime value of the uplink answer is not defined at the step S406, a default ptime value of a corresponding CODEC is selected as a ptime value of a uplink of a terminating terminal at step S407. Table 3 shows an example default ptime values for each CODEC.

TABLE 3

| CODEC | ptime [ms] |
|---|---|
| G.711 | 20 |
| G.723 | 30 |
| G.729 | 20 |
| IPCMWB | 20 |
| EG.711U | 20 |
| ILBC | 20 |

At step S408, the bandwidth required for the uplink of the terminating terminal is calculated using the selected CODEC type and the selected ptime value.

Figure 5:
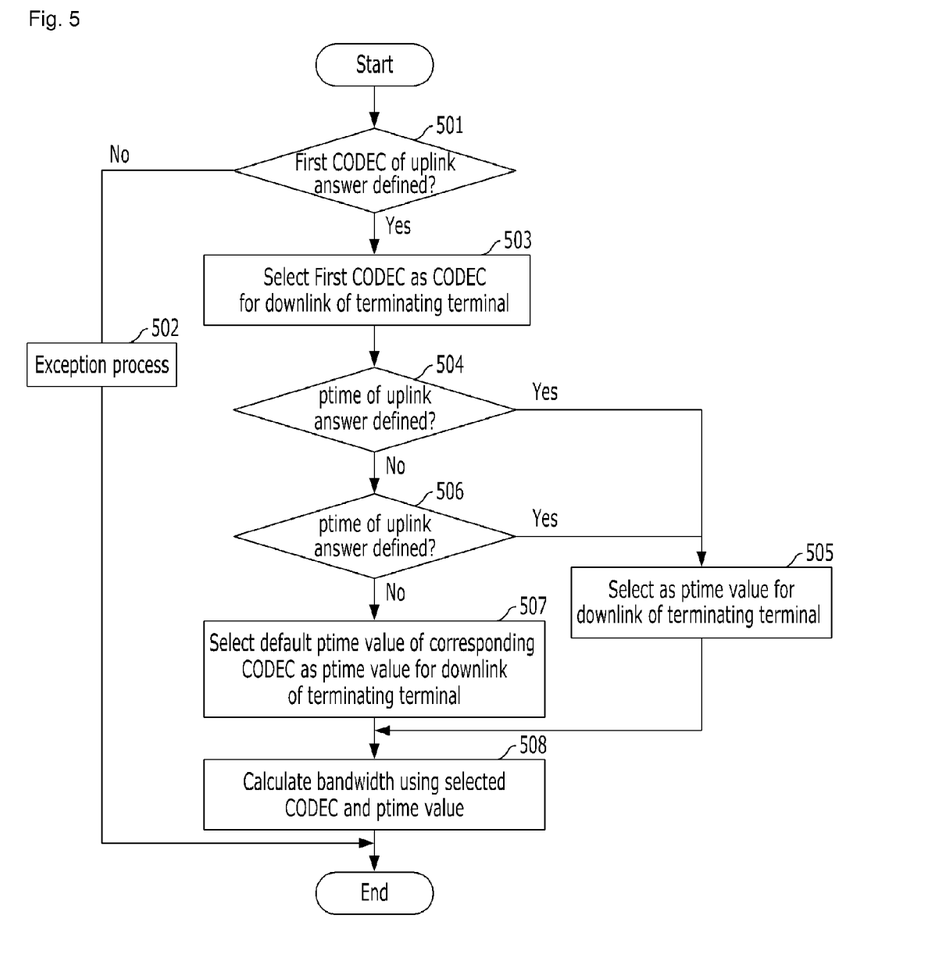
FIG. 5 is a flowchart illustrating a method for calculating a bandwidth required for a downlink of a terminating terminal in accordance with an embodiment of the present invention.

FIG. 5 is a flowchart illustrating a method for calculating a bandwidth required for a downlink of a terminating terminal in accordance with an embodiment of the present invention.

At step S501, it is determined whether a first CODEC of an uplink answer is defined in a CODEC-data AVP in a Media-Component-Descriptor AVP in an AAR diameter message described in the step S230 of FIG. 2. If the first CODEC is not defined, an exception process is performed at step S502. If the first CODEC is defined, the first CODEC of the uplink answer is selected as a CODEC type for a downlink of a terminating terminal at step S503.

At step S504, it is determined whether a ptime value of an Uplink answer is defined in a CODEC-data AVP in a Media-Component-Descriptor AVP in an AAR diameter message shown in the step S230 of FIG. 2. If the ptime value of the Uplink answer is defined, the ptime value of the uplink answer is selected as a ptime value for a downlink of the terminating terminal at step S505.

If the ptime value of the uplink answer is not defined, it is determined whether a ptime value of a downlink offer is defined in a CODEC-data AVP in a Media-Component-Descriptor AVP in an AAR diameter message at step S506. Here, the AAR diameter message was described in the step S230 of FIG. 2. If the ptime value of the downlink offer is defined, the ptime value of the downlink offer is used as a ptime value for a downlink of a terminating terminal at step S505.

If the ptime value of the downlink offer is not defined, a Default ptime value of a corresponding CODEC is selected as a ptime value for a downlink of a terminating terminal at step S507. Herein, the default ptime value was shown in Table 3.

At step S508, a bandwidth required for a downlink of a terminating terminal is calculated according to Eq. 1 using the selected CODEC type and the selected ptime value.

Figure 6:
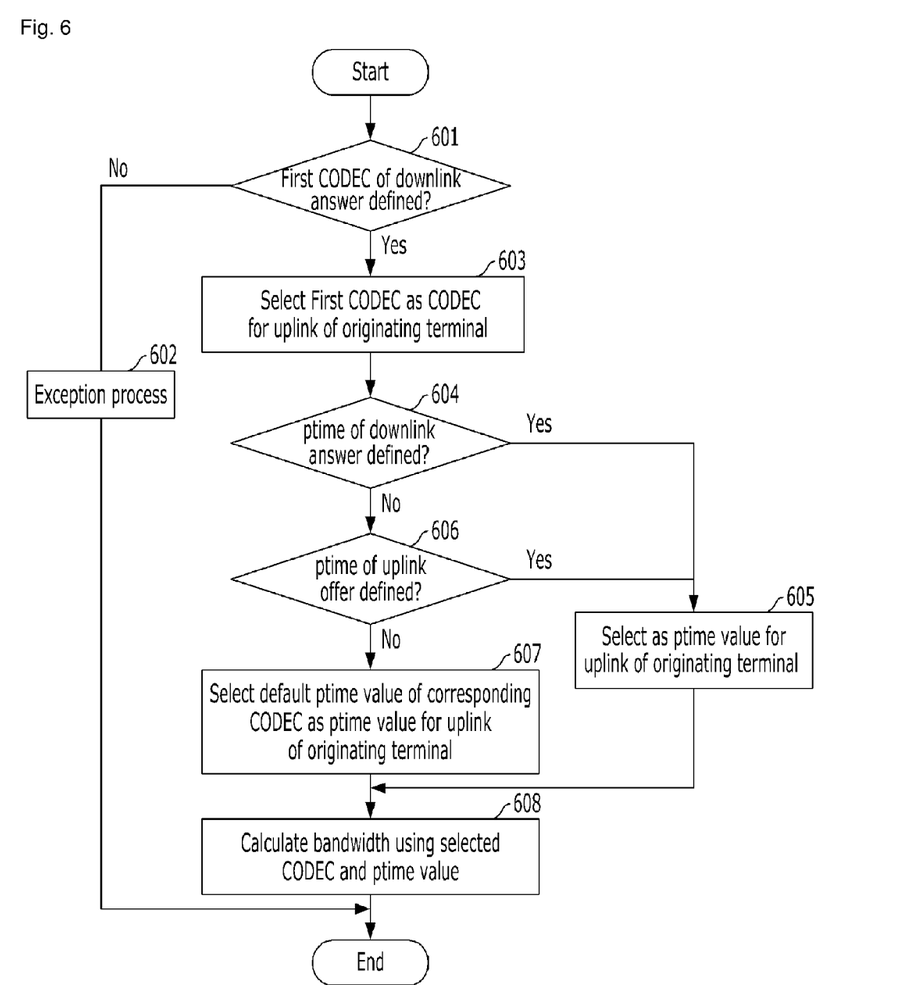
FIG. 6 is a flowchart illustrating a method for calculating a bandwidth required for an uplink of a originating terminal in accordance with an embodiment of the present invention.

FIG. 6 is a flowchart illustrating a method for calculating a bandwidth required for an uplink of a originating terminal in accordance with an embodiment of the present invention.

At step S601, it is determined whether a first CODEC of a downlink answer is defined in a CODEC-data AVP in a Media-Component-Descriptor AVP in an AAR diameter message described in the step S255 of FIG. 2. If the first CODEC of the downlink answer is not defined, an exception process is performed at step S602. If the first CODEC of the downlink answer is defined, the first CODEC of the downlink answer is selected as a CODEC type for an uplink of a originating terminal at step S603.

At step S604, it is determined whether a ptime value of a downlink answer is defined in a CODEC-data AVP in a Media-Component-Descriptor AVP in an AAR diameter message described in the step S255 of FIG. 2. If the ptime value of a downlink answer is defined at step S604, the ptime value of the Downlink answer is selected as a ptime value for an uplink of a originating terminal at step S605.

If the ptime value of the downlink answer is not defined at step S604, it is determined whether a ptime value of an Uplink Offer is defined in a CODEC-data AVP in a Media-Component-Descriptor AVP in an AAR diameter message at step S606. Herein, the AAR diameter message was described in the step S255 of FIG. 2. If the ptime value of an Uplink offer is defined, the ptime value of the uplink offer is selected as a ptime value for an uplink of the originating terminal at step S605.

If the ptime value of the uplink offer is not defined at step S606, a default ptime value of a corresponding CODEC is selected as a ptime value for an uplink of a originating terminal at step S607. The default ptime value was shown in Table 3.

At step S608, a bandwidth required for an uplink of a originating terminal is calculated according to Eq. 1 using the selected CODEC and the selected ptime value.

Figure 7:
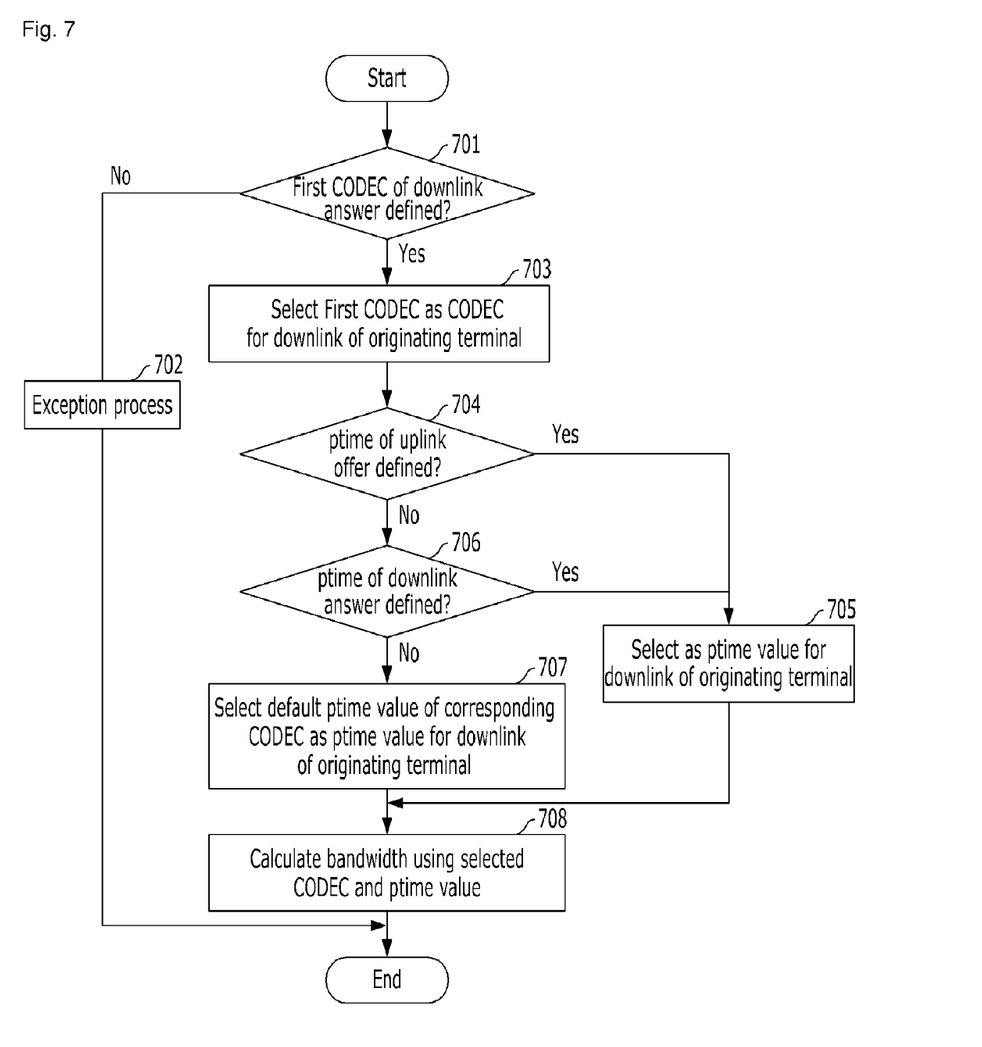
FIG. 7 is a flowchart illustrating a method for calculating a bandwidth required for a downlink of a originating terminal in accordance with an embodiment of the present invention.

FIG. 7 is a flowchart illustrating a method for calculating a bandwidth required for a downlink of a originating terminal in accordance with an embodiment of the present invention.

At step S701, it is determined whether a first CODEC of a downlink Answer is defined in a CODEC-data AVP in a Media-Component-Descriptor AVP in an AAR diameter message described in the step S255 of FIG. 2. If the first CODEC is not defined at step S701, an exception process is performed at step S702. If the first CODEC is defined at step S701, the first CODEC of the downlink answer is selected as a CODEC type for a downlink of the originating terminal at step S703.

At step S704, it is determined whether a ptime value of an uplink offer is defined in a CODEC-data AVP in a Media-Component-Descriptor AVP in an AAR diameter message described in the step S255 of FIG. 2. If the ptime value of the uplink offer is defined at the step S704, the ptime value of the uplink offer is selected as a ptime value for a downlink of the originating terminal at step S705.

If the ptime value of the uplink offer is not defined at the step S704, it is determined whether a ptime value of a Downlink answer is defined in a CODEC-data AVP in a Media-Component-Descriptor AVP in an AAR diameter message at step S706. Herein, the AAR diameter message was described in the step S255 of FIG. 2. If the ptime value of the downlink answer is defined at step S706, the ptime value of the downlink answer is selected as a ptime value for a downlink of the originating terminal at step S705.

If the ptime value of the downlink answer is not defined at step S706, a default ptime value of a corresponding CODEC is selected as a ptime value for a downlink of a originating terminal at step S707. The default ptime of each CODEC was shown in Table 3.

At step S708, a bandwidth required for a downlink of a originating terminal is calculated according to Eq. 1 using the selected CODEC and the selected ptime value.

Meanwhile, the calculated bandwidths required for uplinks and downlinks of originating/terminating terminals are transferred to a network access system in order to dynamically allocate required bandwidth (resource) for communication.

In FIGS. 1 to 7, the present invention has been described from the process point of view. However, the respective steps composing the bandwidth calculating method in accordance with the embodiment of the present invention may be easily understood from the apparatus point of view. Therefore, the steps included in the transmit power control method in accordance with the embodiment of the present invention may be understood as components included in a bandwidth calculating apparatus in accordance with the principle of the present invention.

The bandwidth calculating apparatus in accordance with another embodiment of the present invention includes a reception unit, extract unit and a calculation unit. The reception unit is configured to receive a message having a CODEC type and a ptime value wherein the ptime denotes an interval of transmitting a packet. The extract unit is configured to extract the CODEC type and the ptime value from the received message. The calculation unit is configured to calculate a bandwidth using the extracted CODEC type and the extracted ptime value.

Here, the bandwidth calculating apparatus may be Policy and Charging Rule Function (PCRF). And the reception unit may receive an Authentication, Authorization, and Request (AAR) message having the CODEC type and the ptime value from a originating and terminating Call Session Control Function (CSCF). And extract unit may extract a CODEC type and a ptime value in a CODEC-data Attribute Value Pair (AVP) of the received AAR message.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

A bandwidth calculating method for resource reservation in accordance with an embodiment of the present invention can be applied to a mobile Voice over IP (mVoIP) system.

The invention claimed is:
1. A method for calculating a bandwidth, comprising:
receiving a message having a CODEC type and a ptime value wherein the ptime denotes an interval of transmitting a packet;
extracting the CODEC type and the ptime value from the received message; and
calculating a bandwidth using the extracted CODEC type and the extracted ptime value,
wherein in said receiving a message, a Policy and Charging Rule Function (PCRF) receives an Authentication, Authorization, and Request (AAR) message having the CODEC type and the ptime value from a calling and receiving Call Session Control Function (CSCF); and
wherein said extracting the ptime value includes:
extracting a ptime value in a Session Description Protocol (SDP) transmitted from an opponent terminal;

extracting a ptime value defined in an own SDP when the ptime value is not defined in the SDP of the opponent terminal; and selecting a default ptime value as the ptime value when the ptime value is not defined in the SDP of the opponent terminal and the own SDP wherein the default ptime value is previously defined per each CODEC.

2. The method of claim 1, wherein in said extracting the CODEC type and the ptime value, the PCRF extracts a CODEC type and a ptime value in a CODEC-data Attribute Value Pair (AVP) of the received AAR message.

3. The method of claim 2, wherein said extracting a CODEC type and a ptime value includes:

determining whether a first CODEC of an uplink answer is defined in a CODEC-data AVP of an AAR message from the receiving CSCF and selecting the first CODEC as a CODEC for an uplink of a receiving terminal;

determining whether a ptime value of a downlink offer is defined in a CODEC-data AVP of an AAR message from the receiving CSCF and selecting the ptime value of the downlink Offer as a ptime value for an uplink of a receiving terminal;

determining whether a ptime value of an uplink answer is defined in a CODEC-data AVP of an AAR message transmitted from the receiving CSCF when the ptime value of the downlink offer is not defined, and selecting the ptime value of the uplink answer as a ptime value for an uplink of a receiving terminal; and selecting a default ptime value for the selected CODEC as a ptime value for an uplink of the receiving terminal when the ptime value of the uplink answer is not defined.

4. The method of claim 2, wherein said extracting includes:

determining whether a first CODEC of an uplink answer is defined in a CODEC-data AVP of an AAR message transmitted from the receiving CSCF and selecting the first CODEC as a CODEC for a downlink of a receiving terminal;

determining whether a ptime value of an uplink answer is defined in a CODEC-data AVP of an AAR message transmitted from the receiving CSCF and selecting the ptime value of the uplink answer as a ptime value for a downlink of a receiving terminal;

determining whether a ptime value of a downlink offer is defined in a CODEC-data AVP of an AAR message transmitted from the receiving CSCF when the ptime value of the uplink answer is not defined, and selecting the ptime value of the downlink offer as a ptime value for a downlink of a receiving terminal; and selecting a default ptime value for the selected CODED as a ptime value for a downlink of a receiving terminal when the ptime value of the downlink offer is not defined.

5. The method of claim 2, wherein said extracting includes:

determining whether a first CODEC of a downlink answer is defined in a CODEC-data AVP of an AAR message transmitted from the calling CSCF and selecting the first CODEC as a CODEC for an uplink of a calling terminal;

determining a ptime value of a downlink answer is defined in a CODEC-data AVP of an AAR message transmitted from the calling CSCF, and selecting the ptime value of the downlink answer as a ptime value for an uplink of a calling terminal;

determining a ptime value of an uplink offer is defined in a CODEC-data AVP of an AAR message transmitted from the calling CSCF when the ptime value of the downlink answer is not defined, and selecting the ptime value of the uplink offer as a ptime value for an uplink of a calling terminal; and selecting a default ptime value corresponding to the selected CODEC as a ptime value for an uplink of the calling terminal.

6. The method of claim 2, wherein said extracting includes:

determining whether a first CODEC of a downlink answer is defined in a CODEC-data AVP of an AAR message transmitted from the calling CSCF, and selecting the first CODEC as a downlink CODEC of a calling terminal;

determining whether a ptime value of an uplink offer is defined in a CODEC-data AVP of an AAR message transmitted from the calling CSCF, and selecting the ptime value of the uplink offer as a ptime value of a downlink of a calling terminal;

determining whether a ptime value of a downlink answer is defined in a CODEC-data AVP of an AAR message transmitted from the calling CSCF when the ptime value of the uplink offer is not defined, and selecting the ptime value of the downlink answer as a ptime value for a downlink of a calling terminal; and selecting a default ptime value corresponding to the selected CODEC as a ptime value for a downlink of the calling terminal when the ptime value of the downlink answer is not defined.

7. The method of claim 2, wherein in said calculating a bandwidth, the PCRF calculates a bandwidth required for an uplink of a calling terminal, a bandwidth required for a downlink of a calling terminal, a bandwidth required for an uplink of a receiving terminal, and a bandwidth required for a downlink of a receiving terminal using the extracted CODEC type and the extracted or selected ptime value.

8. The method of claim 7, wherein in said calculating a bandwidth, the bandwidths are calculated using an equation:

$$BW = (TIAS + 320{,}000/ptime)/1000,$$

wherein BW denotes a bandwidth, and TIAS denotes Transport Independent Application Specific bandwidth modifier, and wherein TIAS is decided according to the CODEC type.

9. The method of claim 7, further comprising:

dynamically allocating a bandwidth by transferring the calculated bandwidths required for uplinks and downlinks of the calling and receiving terminals to a network access system.

10. A system for providing a policy and charging rule function and calculating a bandwidth, the system is configured to:

receive a message having a CODEC type and a ptime value wherein the ptime denotes an interval of transmitting a packet;

extract the CODEC type and the ptime value from the received message; and calculate a bandwidth using the extracted CODEC type and the extracted ptime value, wherein the system receive an Authentication, Authorization, and Request (AAR) message having the CODEC type and the ptime value from a originating and terminating Call Session Control Function (CSCF), and wherein the system is further configured to:
   extract a ptime value in a Session Description Protocol (SDP) transmitted from an opponent terminal;
   extract a ptime value defined in an own SDP when the ptime value is not defined in the SDP of the opponent terminal; and
   select a default ptime value as the ptime value when the ptime value is not defined in the SDP of the opponent terminal and the own SDP wherein the default ptime value is previously defined per each CODEC.

11. The system of claim 10, wherein the system extracts a CODEC type and a ptime value in a CODEC-data Attribute Value Pair (AVP) of the received AAR message.

* * * * *